United States Patent [19]

Corley

[11] Patent Number: 4,779,136

[45] Date of Patent: Oct. 18, 1988

[54] CAMERA ALIGNMENT DEVICE

[76] Inventor: Ferrand D. E. Corley, 80 Kleins Crescent, Kleinberg, Ontario, Canada

[21] Appl. No.: 87,310

[22] Filed: Aug. 20, 1987

[30] Foreign Application Priority Data

Aug. 25, 1986 [CA] Canada .................................. 516764

[51] Int. Cl.⁴ .............................................. H04N 3/14
[52] U.S. Cl. .................................... 358/209; 358/139; 358/225
[58] Field of Search .............. 358/139, 229, 225, 209, 358/10, 163

[56] References Cited

U.S. PATENT DOCUMENTS

| | | | |
|---|---|---|---|
| 4,234,890 | 11/1980 | Astle et al. | 358/163 |
| 4,326,219 | 4/1982 | Griesshaber | 358/139 |
| 4,649,324 | 3/1987 | Guerra et al. | 358/10 |

Primary Examiner—Jin F. Ng
Assistant Examiner—Stephen Brinich
Attorney, Agent, or Firm—George A. Rolston

[57] ABSTRACT

A reference image for use with color camera systems and having a support screen, an opening through the screen and a reference image object in registration with the opening, a light panel movably mounted on the screen, whereby the panel may be moved into a variety of different orientations with respect to the screen, and direct light towards the opening.

8 Claims, 2 Drawing Sheets

CAMERA ALIGNMENT DEVICE

The invention relates to a reference image device for use in studios where cameras, TV cameras or video cameras are being used, and has for its purpose the provision of a standard image on which the colour systems of the cameras may be checked and realigned as needed.

BACKGROUND OF THE INVENTION

Colour camera devices such as TV cameras, Video cameras and the like incorporate what are essentially three separate colour channels, which separately sense the three primary colours in the object or scene being recorded.

It is well known that the three separate colour channels must be balanced so as to record the object or scene as a faithful reproduction of its actual colours. For this purpose colour reference images have been proposed in the past. Examples are shown in U.S. Pat. Nos. 3,552,288 and 3,572,943.

These earlier devices are intended for aligning colour telecine camera chains to a standard reference colour balance which will be uniform for all cameras.

It is well known however that the appearance, and particularly the colour and hue of objects, persons and scenes being recorded may vary widely depending upon the light falling upon them. Natural outdoor light produces what most persons experience as the most natural colour. However it is known that even natural outdoor light can vary at different times of day. Artificial light produces a different appearance from natural light, and different forms of artificial light or combinations of artificial light and natural light will produce other variations again. As a result, even though the cameras are first aligned to such a standard reference image, when used for recording images subjected to an unusual form of lighting, the end result may appear to be an unbalanced unnatural colouring.

BRIEF SUMMARY OF THE INVENTION

With a view to overcoming these problems and disadvantages the invention comprises a reference image device having a support screen, an opening through said support screen, means for supporting a reference image object on said screen in registration with said opening, a light panel means movably mounted on said screen, and movement means attached thereto whereby the same may be moved into a variety of different orientations with respect to said screen, and thereby direct light towards said opening.

More particularly, it is an objective of the invention to provide a reference image device having the foregoing advantages wherein the screen is swingably mounted for movement into a variety of different orientations.

More particularly, it is an objective of the invention to provide a reference image device having the foregoing advantages and includes hood means surrounding said opening whereby to restrict the falling of unwanted light on said image panel.

More particularly, it is an objective of the invention to provide a reference image device having the foregoing advantages wherein the light panel means comprises a panel of translucent light diffusion material.

More particularly, it is an objective of the invention to provide a reference image device including rotary mounting means on said screen, providing for 360 degree rotation, and hinge mounting means on said rotary mounting means, said hinge mounting means supporting said light panel means for swinging between a position adjacent said screen, and a position swung at an angle to it, and bracing means releasably engageable with said light panel means for securing same at a desired angular position.

It is a further and related objective of the invention to provide such a reference image device which in one form may be stood on a floor, and in another form may be attached to a wall or suspended from a ceiling or the like.

It is a further and related objective of the invention to provide a reference image device having the foregoing advantages and including a reference image panel located in said opening, said panel having a front and a back, with said light panel being located in registration with said back, and providing illumination for said reference image object from the back.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

DESCRIPTION OF A SPECIFIC EMBODIMENT

Figure 1:
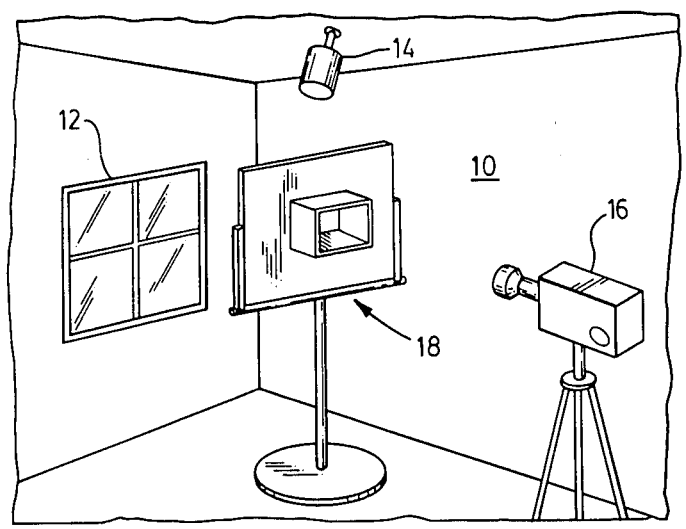
FIG. 1 is a perspective illustration of a corner of a typical studio, illustrating the use of the reference image device according to the invention.

Referring now to FIG. 1, it will be seen that this illustrates somewhat schematically a studio indicated generally as 10 having a window 12 which may admit natural light, and a source of artificial lighting 14.

It will of course be understood that the invention is not limited to use in this particular shape of room or studio, but is of more general application, FIG. 1 being merely shown for the purpose of illustrating the application of the invention to various different light sources.

It is further to be understood that the invention is not limited to use in an indoor environment. It is equally applicable to use outdoors.

FIG. 1 shows a typical camera 16, and a reference image device 18. The camera 16 may be of any type such as may be used in a studio, and in which there are a plurality of colour channels which require alignment. The most common form of such camera is the video camera which may be used either for live telecasting, or which may be used to create a video tape recording.

The details of such cameras are well known in the art, and require no further description.

Figure 2:
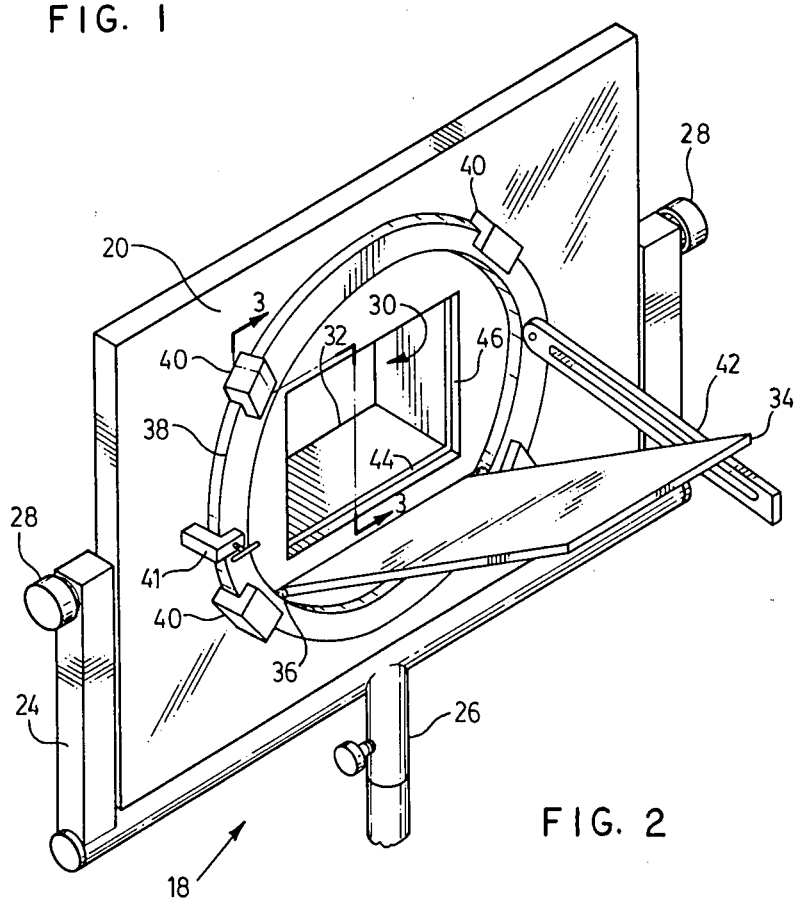
FIG. 2 is a perspective illustration of the reference image device of FIG. 1.
Figure 3:
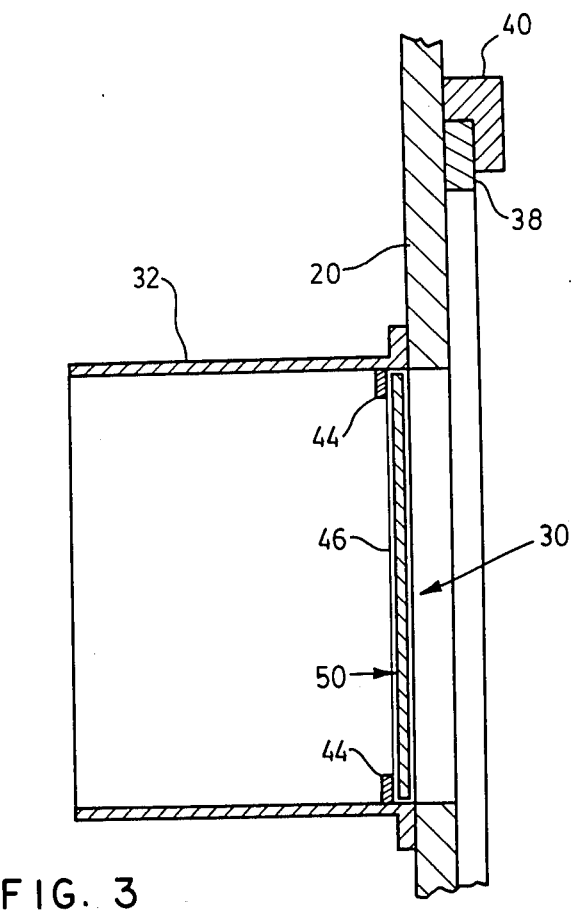
FIG. 3 is a section along the line 3—3 of FIG. 2.

Referring now to FIGS. 2 and 3, the reference image device 18 will be seen to comprise a screen member 20, of opaque material, shown in this example mounted for swinging about a horizontal axis, defined by the yoke 24, and stand 26.

The yoke 24 may be rotatably mounted on the stand 26 if desired so that it can be swung to face in any direction.

It will of course be appreciated that the stand 26 may be replaced by some other form of supporting means such as a supporting bracket (not shown) which may be mounted on a wall or on the ceiling.

Adjustment knobs 28 adjustably secure screen 20 in yoke 24. By loosening off the knobs (the design of which incorporates some form of frictional lock), details of which will be well understood to persons skilled in the art, the screen may be swung in the yoke, after which the knobs may be tightened up to secure it in the desired position.

The screen 20 defines a more or less centrally located rectangular opening 30, and on one side of the screen 20, which may be considered the front, a hood 32 is attached around the opening 30, to exclude as far as possible stray light from interfering with the operation of the device.

On the reverse side of the screen 20, which may be considered the back, there is located a light diffuser panel 34. Panel 34 is formed of a transluscent material, typically a milky white form of acrylic plastic sheet such as "Plexiglass" (trade mark).

Light panel 34 is swingably mounted, by any suitable hinge mean such as the pins 36, on a carriage ring 38. Carriage ring 38 is rotatably secured to the reverse side of screen 20 by any suitable form of sliding guide means such as the guide blocks 40. The guide blocks 40 permit the ring 38 to rotate through a full 360 degrees. The blocks 40 locate the ring 38 in a plane parallel to the plane of screen 20, and the ring 38 entirely surrounds the opening 30 through the panel 20, and is located so as to register with it. Clamp 41 may be tightened down on to ring 38 to secure it.

The angular position of the panel 34 may be controlled and set by any suitable means such as a support bracket 42, which may be adjustably controlled and set so as to locate the panel 34 at any desired angle. Typically, the panel 34 may either be swung into a more or less vertical plane, i.e., a plane wherein it is more or less in a plane parallel to the ring 38, and will preferably be capable of being swung to an angle of at least 45 degrees relative to the plane of ring 38, for reasons to be described below.

It will be appreciated that the reference image device as illustrated in FIG. 2 is shown without the actual reference image object itself in position, simply for the sake of clarity. The front side of the screen 20 is provided with a pair of upper and lower slide channels 44, and slots 46 are formed in the opposite sides of the hood 32 so that various different reference image objects can be slid into position.

Figure 4:
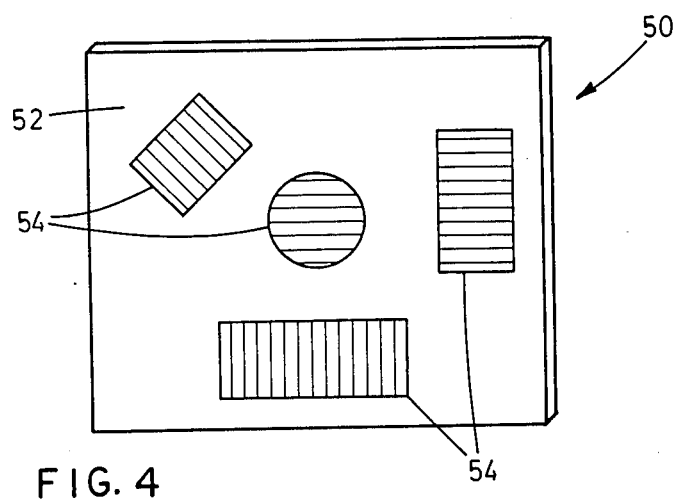
FIG. 4 is a perspective illustration of an image panel for use in the image device.

A typical reference image object is shown in FIG. 4, and is illustrated generally as 50. The reference image object 50 comprises in this particular embodiment a transparent rigid plate typically being glass or acrylic plastic indicated as 52, on which are mounted a plurality of different pieces of photographic material indicated as 54. Each of the pieces of photographic material may consist of separate bars having a predetermined colouring or density, and may be either grey, or different densities of grey, or different colours and hues, designed and created specifically as reference images.

These reference images may be manufactured in accordance with the techniques described in the aforesaid U.S. Pat. Nos. 3,552,288 and 3,572,943. The invention is not however restricted to the use of that particular form of reference image or manufacture, but the present invention may be used with a variety of different reference images and objects made in a variety of different ways.

In operation, in the studio of FIG. 1, for example, the natural light frm the window is assumed to be adequate. In that case it is desirable to adjust the camera for that light. To do so, the reference image device 18 would be placed near the subject to be taped (photographed). The front of screen 20 would be located facing the camera 16. The light panel 34 would then be adjusted in such a way as to direct natural light onto the rear of the reference image 50.

The camera is then adjusted so as to record a true colour-balanced rendering of the reference image, and is then ready for use.

If artificial light is used, the light panel 30 is readjusted to pck up artificial light and direct it on the rear of the reference image.

The device is portable and can readily be transported to any location.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A reference image device for use with a reference image object for camera systems and comprising:
    a support screen;
    an opening through said support screen;
    means for supporting a reference image object in registration with said opening;
    light panel means movably mounted on said screen, and,
    movement means attached thereto whereby the same may be moved into a variety of different orientations with respect to said screen, and thereby direct light towards said opening.

2. A reference image device as claimed in claim 1 wherein said screen is swingably mounted for movement into a variety of different orientations.

3. A reference image device as claimed in claim 2 including stand means for said support screen whereby the same may be stood on a floor.

4. A reference image device as claimed in claim 1 including hood means surrounding said opening whereby to restrict the falling of unwanted light on said image object.

5. A reference image device as claimed in claim 1 wherein said light panel means comprises a panel of translucent light diffusion material.

6. A reference image device as claimed in claim 1 including rotary mounting means on said screen, providing for 360 degree rotation, and hinge mounting means on said rotary mounting means, said hinge mounting means supporting said light panel means for swinging between a position adjacent said screen, and a position swung at an angle to it, and bracing means releasably engageable with said light panel means for securing same at a desired annular position.

7. A reference image device as claimed in claim 1 including a reference image object located in said opening, said object having a front and a back, with said light panel being located in registration with said back of said object, and providing illumination for said reference image object from the back.

8. A reference image device as claimed in claim 7 including releaseable mounting means for releaseably mounting said reference image object on said screen.

* * * * *